US006832209B1

(12) United States Patent
Karp et al.

(10) Patent No.: US 6,832,209 B1
(45) Date of Patent: Dec. 14, 2004

(54) METHOD AND APPARATUS FOR TAX-EFFICIENT INVESTMENT USING BOTH LONG AND SHORT POSITIONS

(76) Inventors: Ronald A. Karp, 58 Runnymeade Rd., Berkeley Heights, NJ (US) 07922; Jeffrey M. Karp, 249 Long Hill Dr., Short Hills, NJ (US) 07078

( * ) Notice: Subject to any disclaimer, the term of this patent is extended or adjusted under 35 U.S.C. 154(b) by 0 days.

(21) Appl. No.: 09/413,440

(22) Filed: Oct. 6, 1999

(51) Int. Cl.[7] .............................................. G06F 12/60
(52) U.S. Cl. ........................................ 705/36; 705/37
(58) Field of Search .............................. 705/36, 37, 35; 340/825.27, 835.26

(56) References Cited

U.S. PATENT DOCUMENTS 6,161,098 A * 12/2000 Wallman ...................... 705/36

FOREIGN PATENT DOCUMENTS

WO     WO 02/089027 A2 * 11/2002 ........... G06F/17/60

OTHER PUBLICATIONS

Dictionary of Business Terms, Barron's Educational Series, Inc., 2000, Third Edition, pp. 338, 496 and 497.*
Dictionary of Fianance and Investment Terms, Barron's Educational Series, Inc., 1998, Fifth Edition, pp. 79, 80, 81, 297 and 567.*
Bruce I. Jacobs and Kenneth N. Levy, 20 Myths about Long–Short Financial Analysts Journal, Sep./Oct. 1996, pp. 81–85.
T. Daniel Coggin and Frank J. Fabozzi, Applied Equity Valuation, Chapter 10, Market–Neutral Portfolio Management, 1998, pp. 165–183, publisher Frank J. Fabozzi Associates, PA, USA.
Jess Lederman and Robert A. Klein, Market Neutral, Chapter 1, Introduction to Market–Neutral Investing, 1996, pp. 1–16, Irwin Professional Publishing, Chicago, IL, USA.
Jess Lederman and Robert A. Klein, Market Neutral, Chapter 5, Alternative Quantitatiave Approaches to Long/Short Strategies, 1996, pp. 73–92, Irwin Professional Publishing, Chicago, IL.
John C. Bogle et al, Market Neutral Round Table, Journal of Hedge Fund Research, Fall 1995, pp. 1–18.
Karen Hube, Wall Street Journal, Market–Neutral Mutual Funds etc., May 13, 1998, p. C–1.
MF Cafe (Internet Download http://www.mfcafe.com/pantry/bps–062298.html), Market Neutral Funds, 7127198, pp. 2–3.
Alyssa A. Lappen, The positive lure of market neutral, Institutional Investor, Sep. 1998, pp. 185–186.
Barr Rosenberg Series Trust, Prospectus, Jul. 30, 1999, pp. 1–44.
Dreyfus, Dreyfus Premier Market Fund Prospectus, Feb. 1, 1999, pp. 1–11.
Vanguard, Vanguard Tax Managed Funds Prospectus, Feb. 22, 1999, pp. 1–22.

* cited by examiner

Primary Examiner—Robert P. Olszewski
Assistant Examiner—Elaine Gort
(74) Attorney, Agent, or Firm—Leonard Berkowitz

(57) ABSTRACT

Methods and apparatus are provided for investment which utilize knowledge which predicts both financial instruments which are expected to outperform their markets and financial instruments which are expected to underperform their markets. By using this information as well as risk information a portfolio is assembled which contains both long and short holdings. The portfolio also uses leverage. The portfolio is managed so that loss positions are aggressively harvested while still short term and gains are held for the long term.

6 Claims, 3 Drawing Sheets

DEVELOPMENT OF PORTFOLIO MANAGEMENT INPUTS

PORTFOLIO MANAGEMENT PROCESS

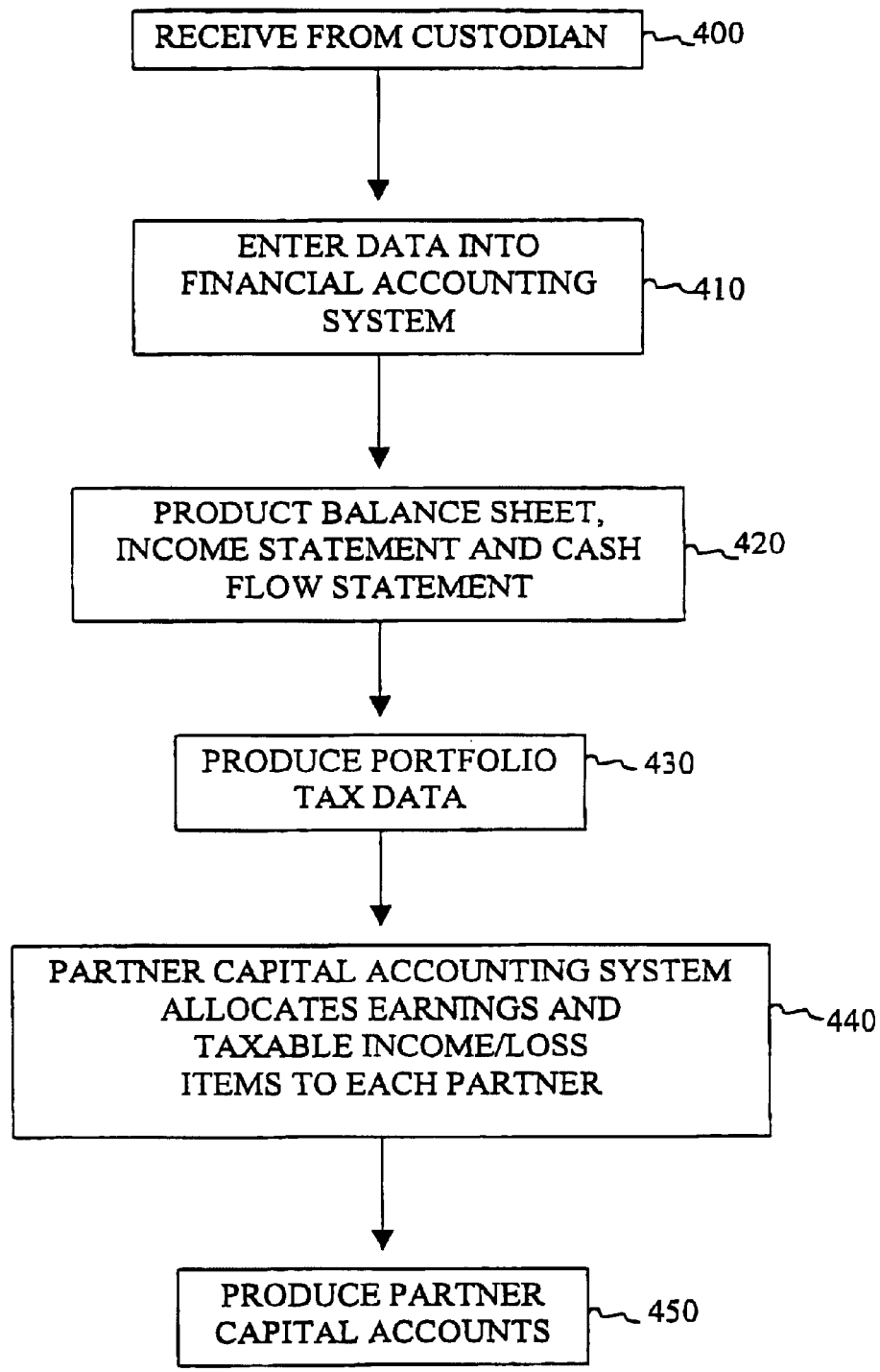

METHOD AND APPARATUS FOR TAX-EFFICIENT INVESTMENT USING BOTH LONG AND SHORT POSITIONS

BACKGROUND OF THE INVENTION

This invention relates to a method and apparatus for investment of funds. More particularly, this invention relates to a method and apparatus which will benefit from investing in financial instruments whose value is expected to decrease relative to the overall market as well as those whose value is expected to increase relative to the overall market.

A wide variety of investment strategies are known to those in the field. Pure long strategies aim to invest in stocks, bonds, or other financial instruments whose value is expected to appreciate. One method is to invest in a pool of stocks which simulate an index such as the Standard and Poor's 500 Stock Index or the Dow Jones Industrial Average. Another method is to invest in individual or multiple equities whose value is expected to appreciate faster than the indices. A variety of techniques are used to select these equities ranging from analysis of the chart patterns of price and volume history for the equity to fundamental analysis and projections of the underlying business of the company represented by the equity. These methods are referred to as being long or taking long positions. Another method of investing seeks to benefit from financial instruments whose value is expected to decrease. In this method, said instruments are borrowed and sold, in the expectation that the borrowed instrument can be purchased and returned in the future at some lower price. This technique is referred to as selling short or taking short positions. This short selling technique is also commonly used by hedge funds. Short selling generates a cash position and the investor can earn an interest return on this cash.

When the value of the financial instruments that are held is greater than the amount of capital being invested, the position is described as leveraged. The use of leverage is common for long, short, or combined investment strategies. The amount of leverage available is often limited by regulation so as to limit risks. Regulatory changes in 1996 and 1998 have allowed investors to utilize higher leverage amounts. The amount of leverage can be expressed as the ratio of the value of total long plus short investments to the capital invested, expressed as a percent. Thus, if $100 is invested to purchase $100 worth of financial instruments and to sell short $100 worth of financial instruments, the leverage is 200%. The portfolio will be described as 100% long and 100% short. If the investment manager is successful at choosing better performing longs and/or shorts, then the use of leverage will multiply the benefits to the investor.

Many professional managers or management companies invest in baskets of financial instruments, for example stocks, and sell interests in these investment pools to the public. The most common examples are called mutual funds. They mainly use long strategies. Mutual fund investments often produce undesired taxable income for their investors. Even if an investor in a mutual fund or similar entity does not want to sell but rather hold the fund for long term growth, taxable income for that investor will often be generated because the fund chooses to sell some of its holdings for gains. Such sales may also be necessary to generate cash if a party decides to redeem from the fund. The investor will then have to pay income tax and reduce the amount of capital available for investment. Mutual funds which have low turnover, meaning infrequent changes in their portfolios, reduce this problem. Many of these are index funds such as the Vanguard S & P 500 Index Fund. A few funds, for example Vanguard Tax-Managed Balanced Fund, go even further to avoid the generation of taxable income. When positions are sold for gains, they also attempt to offset the gains by selling some of the positions in which they have losses. These tax minimization strategies do, however, limit the flexibility of the funds to change their holdings to take advantage of new circumstances. These funds do not use leverage or strategies which combine long and short positions. Nor do they attempt to isolate short term losses which might be useful to the investor to offset capital gains he may have in other holdings.

Some investment strategies combine both long and short positions. This allows the investment manager to take advantage both of opportunities which are undervalued versus the overall market and opportunities which are overvalued. Such portfolios are discussed in the article by Jacobs and Levy in the Financial Analysts Journal, September/October 1996. A common type of long-short portfolio is a market neutral portfolio. This approach is further discussed in chapter 10 of a book by T. Daniel Coggin and Frank J. Fabozzi entitled *Applied Equity Valuation*, published by Frank J. Fabozzi Associates, New Hope, Pa., 1998, and in a book edited by Jess Lederman and Robert A. Klein, entitled *Market Neutral*, published in 1996 by Irwin Professional Publishing, Chicago, Ill., especially chapters 1 and 5. The return on a market neutral fund can depend only on the skill of the person who selects the securities or other financial instruments. Positive returns can be achieved independently of moves in the overall market. If the overall market moves up, positive performance can be achieved if the longs perform better and/or the shorts perform worse than the overall market. If the overall market drops, positive performance can again be obtained if the longs perform better and/or the shorts perform worse than the overall market. Several market neutral mutual funds are available to the public. These are discussed in a Wall Street Journal article of May 13, 1998 and information is also available in fund prospectuses. These funds seek to capitalize on long and short stock picking judgments to yield higher returns than conservative fixed income instruments while maintaining low risk. They do not use leverage to multiply the value of the judgments and do not attempt to manage the tax consequences to the investor.

Market neutral investments are also available as private placements to qualified investors. The prospectuses for such investments are not public documents since they are offered only for purposes of evaluating the investment. Both public and private market neutral funds are discussed in volume 2 of the Journal of Hedge Fund Research, Fall 1995, pages 1–18. Many market neutral investments seek to get better returns than low risk investments such as treasury bills without incurring high risks of losses that might be present in other investment instruments. The article mentions the use of leverage as high as 400%. Other market neutral approaches target higher returns by accepting higher risks. These can also be leveraged. However, these investment approaches focus on the security selection and are relatively insensitive to the tax consequences. This is a disadvantage to the tax paying investor who may have to reduce his total capital under investment in order to pay the taxes incurred. Funds which are structured as limited partnerships or other pass through entities can avoid some of the problems of taxable income by distributing securities instead of cash to investors who choose to redeem. However, they will still cause taxable income to the investors when they sell assets which have increased in value or cover shorts which have decreased in value. The taxable income will frequently occur as short term capital gains. Under current tax laws in the United States, these occur when an investment is held for less than 12 months before it is sold. If the investments are held for 12 months or more before sale they will generate long term capital gains and these will be taxed, albeit at a lower tax rate according to current United States tax law. The gain or loss on a covered short is treated as short-term no matter how long the position has been held.

The particular instruments to be purchased or sold short may be selected by a variety of techniques for predicting expected returns. One family of techniques relates to the analysis of charts of the historical stock movements and their volume. Certain patterns on such charts are believed to be predictive of future stock movements. These techniques are sometimes referred to as technical analysis or charting techniques. One such method is called the Dow theory. Another family of techniques relates to fundamental analysis of the enterprise issuing the financial instrument. The business is modeled and future earnings and dividends are projected. Using a discount rate, the dividends stream and terminal value of the enterprise are converted to a present value and compared to the market price. Other techniques reflect the value of stocks compared to peers using factors such as earnings and dividend growth, dividends, price to earnings ratio, price to book ratio, etc. Other techniques fall in the category of momentum analysis, selecting the financial instruments which seem to be moving most favorably. Other factors such as insider trading patterns can also be utilized. The above and other factors are often combined into mathematical or computer models which can be used to predict the best and worst performing financial instruments. Such modeling methods are referred to as quantitative methods and are described in Chapters 5 of the Lederman/Klein book and 10 of the Coggin and Fabozzi book and in the aforementioned article in the Journal of Hedge Fund Research. In current practice, these investment techniques to evaluate and rank individual securities may be highly quantitative and dependent on computer modeling or they may be more judgmental and qualitative.

The expected return data on individual financial instruments are combined with risk related data such as volatility of the instrument and the expected correlation of returns among the instruments The interaction of these factors allows the development of an array of portfolios with different risk vs. return characteristics. Each portfolio consists of a group of financial instruments. Volatility is an important factor in the calculation of the riskiness of an individual financial vehicle. It may be described by a beta number for the stock which is the ratio of the historical price change (as percent) of the stock compared to the historical price change (as percent) of the overall market. It may also be described statistically as the standard deviation of the price of the stock. Portfolio risk can be reduced or eliminated by balancing the longs and shorts for factors such as industry, size, location, currency sensitivity, and labor sensitivity. A common group of such factors is called the Barra risk factors. The calculation of risk profile is known to those in the art and is described for example in Chapter 10 of the text by Coggin and Fabozzi and in the above mentioned article from the Journal of Hedge Fund Research. Once expected returns are known and risk data are collected, these can be combined in an optimization process by a variety of methods. Such optimization services can be purchased from a variety of suppliers, including BARRA, Berkeley, Calif., Advanced Portfolio Technologies (APT), New York, N.Y., Northfield Information Systems, Inc., Boston, Mass., and Vestek Systems, Inc., San Francisco, Calif. These services will generate arrays of portfolios having different predicted returns and different levels of risk. These portfolios reflect the stock ranking process which is intended to produce an excess return compared to the benchmark (such as a market index). Such an excess return is called an "alpha", which is a quantification of the ability of the stock picker to pick longs which do better than the market and/or shorts which do worse than the market. When used in a market neutral portfolio, they are sometimes referred to as double alpha strategies since the alpha is available on both the long and short side. For portfolios which are not balanced on the long and short side, some alpha is still available on each side.

As discussed above, none of the known investment methods combine the benefits of (1) capitalizing on evaluations of short positions as well as longs (2) deferring the need for the investor to reduce capital by paying taxes (3) exploiting the opportunity to aggressively harvest short term losses for the investors and (4) using high leverage to multiply the benefits of the first three items. Harvesting short term losses can produce a benefit to investors who may be able to use them to offset capital gains from other parts of their portfolios. The use of leverage can increase the amount of short term loss that can be harvested from a given level of capital investment.

SUMMARY OF THE PRESENT INVENTION

It is an object of the present invention to provide a method and apparatus for investing which capitalizes on the investment manager's skill for identifying short selling opportunities as well as opportunities of investing in long positions, multiplies the benefits by using leverage, and handles the purchase and sale of the financial instruments in such a way as to defer the need for the investor to pay taxes on capital gains and to aggressively harvest the realization of capital losses which may be utilized to offset any realized gains from this portfolio or from the investor's other holdings.

It is also an object of the present invention to provide a method and apparatus for investing which allows the investment manager to exercise judgment to choose the bias of the portfolio toward a short position, a long position, or a market neutral position, while also using leverage to multiply the results of his judgment and handling the purchase and sale of the financial instruments in such a way as to defer the need for the investor to pay taxes on capital gains and to aggressively harvest losses.

It is a further object of the present invention to provide a data processing apparatus which analyzes and optimizes risks and rewards of portfolios, keeps track of the portfolios, analyzes and optimizes the tax consequences, highlights opportunities for trades, maintains records for investors, and analyzes the preferred way to handle any investors who redeem.

The above and other objects of the present invention are realized by constructing a portfolio of short stocks or other financial instruments which are expected to underperform a market and long stocks or other financial instruments which are expected to outperform a market. Leverage of at least 200% would be used to multiply the expected returns. Such an investment approach is expected to produce a mixture of gains and losses in the portfolio. Investment losses would preferentially be realized as short term losses and positions in which there is a gain would preferentially be kept indefinitely as investments. Structure of the investment vehicle as a pass-through entity can generate some additional benefits by avoiding the need to realize gains even when investors redeem their investment.

It is to be understood that both the foregoing general description and the following detailed description are exemplary and explanatory and are intended to provide further explanation of the invention as claimed.

BRIEF DESCRIPTION OF THE DRAWINGS

The accompanying drawings illustrate an embodiment of this invention and, together with the description, explain advantages and principles of the invention.

FIG. 3 illustrates an accounting process for generating information for the individual investors, including the allocation and additional accounting steps necessary if a pass-through vehicle, such as a partnership, is used.

DETAILED DESCRIPTION OF THE INVENTION

Figure 1:
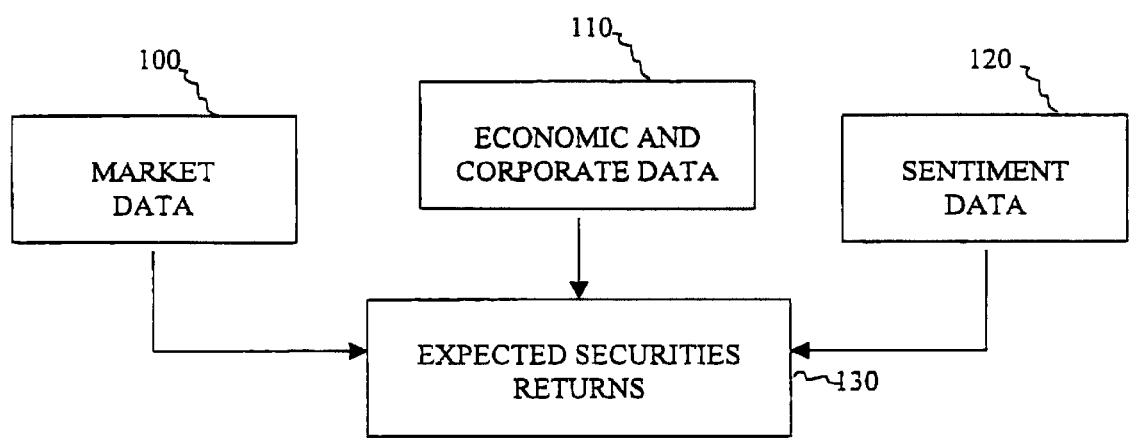
FIG. 1 is a diagram which illustrates the process for ranking securities according to their expected returns.

The present invention is a form of long-short investment. This means purchase of a group of financial instruments which is selected based on expectations that they will perform better than the average of the market and short selling of another group of financial instruments which are selected based on expectations that they will perform more poorly than the average. The market is the population of financial instruments from which these particular choices are made. By including both longs and shorts in the portfolio, the investment manager may take advantage of his judgments which are both favorable and unfavorable toward financial instruments and therefore is using more of his available information. It is preferred that a portfolio would be diversified.

The portfolio should be leveraged at least 200% to multiply the benefits from these judgments. The portfolio does not need to be balanced or neutral between longs and shorts. It can contain from 10 to several hundred % shorts and from 10 to several hundred % longs. These percents are calculated from the ratio of the value of the holdings to the value of the capital invested. In one embodiment, the portfolio would be evenly balanced between shorts and longs, i.e. market neutral.

The potential investments chosen include all financial instruments which can both be purchased and borrowed for sale, the latter being synonymous with sold short. These include, without limitation, stocks, including both U.S. stocks and those traded anywhere else in the world, bonds or other forms of debt, currencies, commodities, closed end mutual funds, market index futures, and traded index instruments such as SPDRS. The approach to using all of these instruments in a long short mode is discussed in Chapter 1 of the text by Coggins and Fabozzi. Different classes of instruments may also be combined in the same portfolio.

Modeling techniques and risk evaluation techniques, as discussed in the background section of this specification, are combined to produce an array of portfolios which vary in their predicted returns and risks. The final balance of return and risk would be chosen by the investment manager.

In a long-short portfolio levels of leverage can become very high. The leverage chosen will depend on risk judgments by the investment manager as well as by any applicable regulation and by the governing rules of the custodial service or other agent which is actually implementing and lending securities or funds for the investment positions. This invention visualizes using leverage of at least 200% to multiply the benefits obtained from the investment manager's skill in picking longs and shorts. For example, if the longs and shorts are perfectly matched except that the manager is able to pick longs that do 2% better than the market and shorts which do 2% worse than the market, an unleveraged portfolio (i.e. 50% by 50%) would produce a return of 2% over the safe interest return. A portfolio which is leveraged 400% (i.e. 200% by 200%) would produce a return of 8% over the safe interest return. Both of these returns would be decreased by transaction costs and other costs of operating the account.

The method of this invention includes a special sensitivity to the tax effects of the transactions. Under current U.S. tax law sale of a security for a profit produces a type of income which is called a capital gain. The same is true when a borrowed security which has been sold short is replaced or covered by purchasing that security and the transaction produces a profit. Many states add their own taxes. Short term gains are those which are taxed at a higher rate. Under current law, these are gains coming from positions which had been held for less than twelve months or from any gains coming from covering short positions. Long term gains are those which are taxed at a lower rate and, currently arise when long positions are held for twelve months or more before sale. Currently, both taxes are graduated, with their maximum tax rates being 39.6% on short term gains and 20% on long term gains. If there are net losses instead of gains from a portfolio, these may be used to offset other gains that the investor may have from other sources. According to the current invention, the portfolios will be periodically reviewed. They are expected to show both gains and losses among the individual holdings. In general under current tax law, the losses will be harvested by selling the long position while they are still short term or, at any time, by covering the short position. Criteria for harvesting short term losses are set by the investment manager. For example, financial instruments may be sold whenever a short term loss reaches 5 percent, or alternatively, 10 percent, or some other selected percent. Notwithstanding the above, the investment manager would have the ability to override any criterion selected or to change such a criterion. Holdings which have gains will be kept in the portfolio for the long term. Tax regulations may change but when we refer to short term gains in this specification, we mean those which are taxed at a higher rate than another class or classes of gains which we call long term gains. Similarly, short term losses are those which can be used to offset short term gains, This approach will defer any requirement for the investor to pay income tax on the gains and will allow the investor to keep all of his capital in the form of investments. If net losses are harvested from the long-short portfolio, the benefits will be even greater if the investor has short term capital gains from other sources. These losses will eliminate the need to pay taxes on some or all of those gains. The use of leverage conveys the benefit of increasing the amount of potential losses generated from a given amount of capital investment.

When cash is generated for the portfolio either because holdings are sold or because new investment monies are received, the same kind of risk return considerations discussed above are used to invest the additional capital. In any case, the portfolio would periodically be reevaluated for changes in the input variables and positions would be adjusted as necessary.

One embodiment of this invention uses a market neutral portfolio in which the long and short portions are evenly balanced. In addition, the long and short portions may be carefully matched as to volatility, industry sector, capitalization, ratio of price to earnings, ratio of price to book value, and other factors such as are included in the Barra factors. Such a portfolio can significantly remove the effect of overall market movement, whether up or down and produce returns which depend only on the skill of the investment manager in picking stocks to buy which do better than the overall market and stocks to sell short which do worse than the overall market. Thus, the level of risk is reduced. The reduction of risk is also facilitated by maintaining broad diversification, for example 100 or more stocks long and 100 or more stocks short. In addition, the short sales will produce cash that can earn a safe rate of interest. Thus, this market neutral investing can produce a safe interest return plus investment manager skill returns.

In a preferred embodiment, this investment system would be organized as a pass-through entity. For purposes of this patent, we define a pass-through entity as any organizational structure which is not taxed at the entity level and which permits a distribution-in-kind to its participants which is not deemed to be a taxable event to the entity or the recipient. A distribution-in-kind is a distribution of some of the financial instruments which are held by the entity as payment, for example, to a redeeming participant. Common examples of this type of entity are limited partnerships and limited liability corporations. In this embodiment, when investors redeem from the system, some or all of their value would be conveyed by distributing some of the financial instruments in kind. This avoids the need to sell positions and create gains which may then have to be allocated to the other participants and which would cause tax consequences to them.

In another benefit of this invention, this investment vehicle can be used by an investor to diversify an existing portfolio which contains one or more holdings which represent a large proportion of his portfolio and which also contain large potential capital gains. If these holdings are sold and reinvested to diversify the portfolio, taxes would be due on the capital gains. This invention will generate short term capital losses to offset the gains. As these losses become available, the large holdings can be sold and the long short portfolio will provide diversification.

With the foregoing overview in mind, this invention is illustrated by reference to FIGS. 1 to 3.

FIG. 1 illustrates a method for ranking investment instruments according to their expected returns. The first input 100 is the market data covering the universe of securities present in whatever market is selected. The specific data would include such variables as price and price change patterns, trading volume and volume patterns and returns on securities and on various segments of the overall market. Examples of markets are New York Stock Exchange Stocks, Hang Seng Index stocks, or U.S. corporate bonds. These examples are cited for illustration only and are not intended to be limiting.

In activity 110 data relative to the enterprise represented by the financial instrument are collected and inputted to activity 130. The data include current, historical and projected economic performance such as sales, earnings, sales growth, earnings growth, and returns on investment. In addition, historical and projected data with respect to macroeconomic variables are utilized.

In activity 120 additional data are collected and inputted regarding sentiment. These variables would include indicators of opinion and opinion change with respect to individual securities, market segments and overall markets. Among such variables would be analysts' evaluations, changes in such evaluations and changes in opinion regarding projected economic performance.

With respect to the above inputs (100, 110 and 120), the specific data to be collected will depend on the model used in activity 130. These data are inputted to activity 130 which calculates expected securities returns. The inputted data are analyzed in 130 using the selected model and computer software, which activity may be done as a purchased service, to produce a seriatim list of investment instruments, starting with those which are expected to perform best versus the market and ending with those which are expected to perform worst versus the market. Each member of the seriatim would have a quantification of its expected return versus the market.

Figure 2:
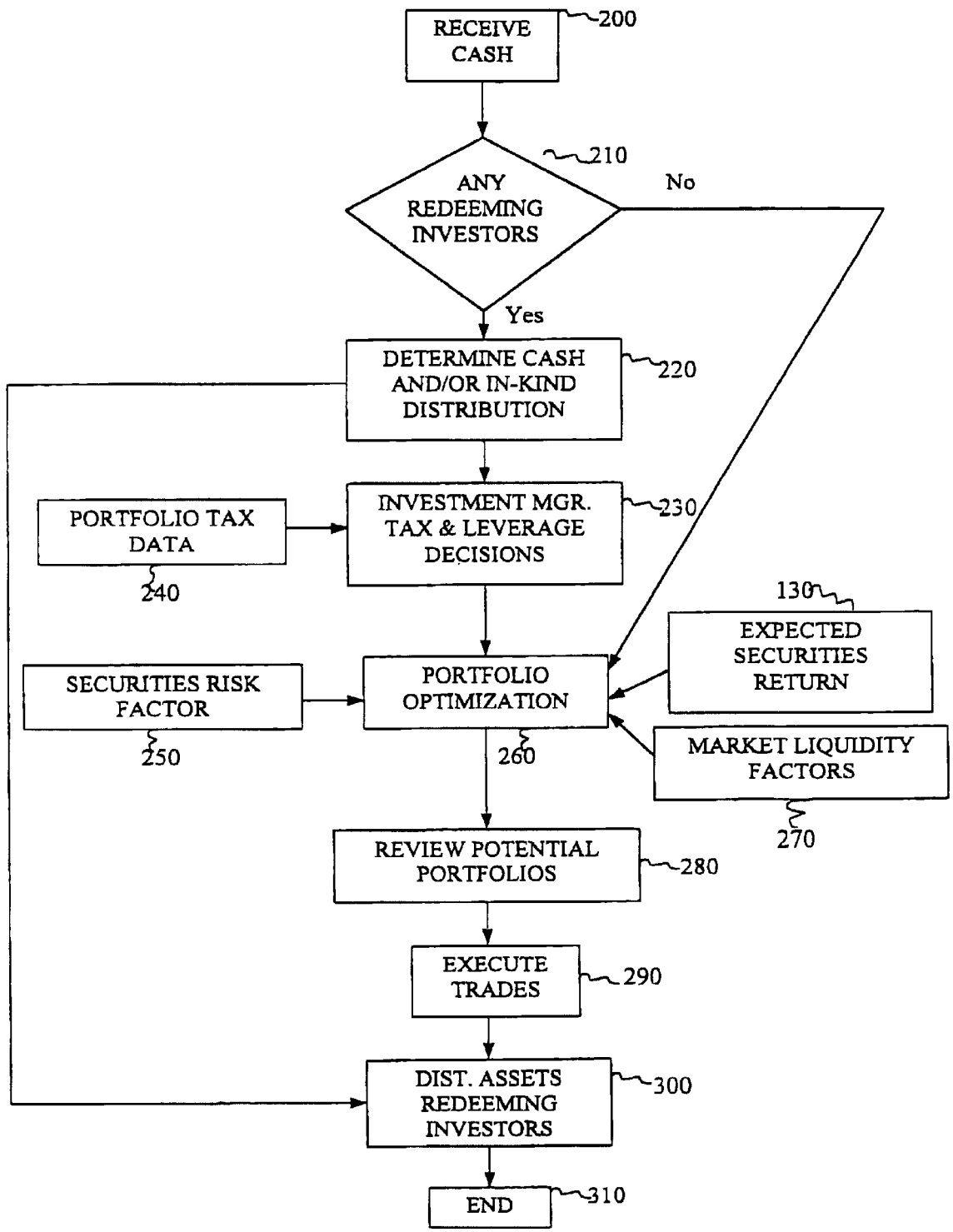
FIG. 2 is a flow chart which illustrates how the investment method of this invention operates.

FIG. 2 is a flow chart which illustrates how the method of this invention operates. The cycle begins at 200 with the receipt of cash. This is the capital to be invested. It can arise from the initial investment at the start of the process, from new investment from additional investors who join, or from the proceeds of sales later in the process. In activity 210, it would be determined whether any investors are redeeming. If the answer is yes, the existing portfolio would be evaluated in 220 to determine what combination of cash and/or in kind distribution would be most favorable for the investment entity. A computer program would be used as a means for evaluating when the pass-through entity is advantaged by in-kind distribution to redeeming investors. Under current tax law, use of an in-kind distribution in a pass-through entity may offer tax benefits to both redeeming and continuing investors, since this is not considered to be a taxable event. This would be particularly beneficial to the redeeming investor if he chose to continue to hold the securities rather than sell them. The combination of cash and securities which is selected in 220 would be distributed to redeeming investors in activity 300. The remaining portfolio would be analyzed in activity 230 after input of the portfolio history and tax data from 240. These data come from the accounting system and are the same as the data from 430 in FIG. 3. This encompasses the list of all security positions held, their time of holding characterized as short term or long term, and their gain or loss position. This information allows determination of the taxable capital gain or loss that would be realized if a holding was sold or a short covered. Of course, for the startup of the investment vehicle, there will be no such historical information. The loss harvesting criterion, for example to sell or cover all positions showing short term losses of 10 percent or more, would be implemented here and positions would be selected for sale or cover. Of course, this loss criterion could be modified or overridden by the judgment of the investment manager. Also in activity 230, the amount of leverage in the portfolio would be examined from time to time and decisions would be made by the investment manager as to the desired level of leverage As noted earlier, this invention includes the use of leverage of 200% or more. Greater leverage magnifies the effect of the ranking process for individual securities (activity 130) and also of the potential tax benefits which are considered in the periodic portfolio optimization (activity 260). Since the ranking process may not operate effectively in all time periods, any undesirable returns from ineffective ranking will also be magnified by the leverage utilized. Therefore, the decision as to the amount of leverage is an important factor in determining the risk level in the account. This decision may be fixed at the initiation of an account, but would more likely be subject to periodic review by the investment manager. Further, in activity 230, the investment manager may revise his judgment as to the appropriate long-short balance in the portfolio.

The information from 200 and 220 and the portfolio modifications decided in 230 are among the inputs to the inputs to the optimizer, 260. The latest financial instrument ranking list from 130 is also inputted to 260. In activity 250, data related to securities risk are collected and inputted to the optimizer. These data include the expected volatility for each security and cross-correlation statistics among the securities. Historical data with respect to these variables is readily available and adjustments from historical information may be judgmentally determined if necessary to better represent the expected future experience.

In activity 270, information regarding the market liquidity for each security is collected and inputted to the optimizer. Market liquidity is a measure of the degree that purchase or sale of a particular security will cause the market price of that security to move. Together with any commission or other trading expense, the price change constitutes a transaction cost which one would like to minimize. From this standpoint, all other factors being equal, a security with high liquidity (lower transaction costs) would always be preferred over one with low liquidity.

In activity 260, the optimizer, an array of possible portfolios with different expected risk-return characteristics will be generated. The objective of an optimizer is to select those portfolios that, for a given level of expected risk, produce the highest possible expected return; likewise, it selects portfolios that, for a given level of expected return, incur the lowest possible levels of expected risk. This is done by a software program which combines, for each security, the expected return data with the risk or volatility data and the correlation data among all of the eligible securities. As has been discussed in the background section, such programs are known to the art and such services can be purchased from the suppliers listed there or others. It is not the object of this disclosure to invent new such programs. However, the invention disclosed herein will work with any newly developed, improved or modified models. The prediction of expected returns as well as the generation of portfolios with varying risk return profiles are discussed in Chapter 10 of the Coggin and Fabozzi text, and the above mentioned article from the Journal of Hedge Fund Research. The prediction of returns is also discussed in Chapter 5 of the Lederman and Klein text. These three citations are incorporated by reference.

The optimizer considers as potential investments both the existing holdings and all of the other securities from the eligible universe. In addition to risk, return and correlation data, the optimization process considers the impact on return of expected transaction costs in order to effect changes in the portfolio.

In activity 280, the potential portfolios would be reviewed and a selection of the desired risk-return combination would be made by the investment manager. This decision could also be handled by a software program if risk-return criteria are predetermined and are unchanged. When the investment entity is in a start-up mode, the portfolios being considered are those arrays which are generated in 260. In the case of the ongoing entity, it will be the existing portfolio with a series of possible modifications which generate new arrays varying in risk-reward characteristics. These modifications are generated by any new inputs of information to 260, by the possibilities for investing additional capital from 200, from increases or decreases of capital arising from decisions taken in activity 230 on loss harvesting or leverage, and from the preferred mode of handling any redeeming participants in activity 220. The selected portfolio modifications would be decided in 280 and this, along with decisions taken in 220 and 230 would lead to the need to execute trades in 290 to establish the new portfolios. Any necessary assets, whether in cash or in-kind, would be distributed to redeeming investors in 300 and the cycle would end in 310. This whole cycle would be rerun at periodic intervals.

FIG. 3 illustrates an accounting process for keeping track of the status of an account and, if a commingled passthrough vehicle such as a partnership is used, the status of individual investors. Each investor will get periodic information as to the status of his investment and year end information on status and taxable events. In 400 information will be inputted from the custodian of the securities as to holdings, original cost, acquisition dates, and current values. The custodian may be a brokerage house or similar entity. In 410, the data are entered into a financial and accounting system. Such entry could be done manually into a computer program or, preferably, transferred directly from the custodians computer program to the accounting program. In 420, the program generates an overall balance sheet, income statement, and cash flow statement for the entity. In 430, the program produces data on taxable gains and losses for the portfolio. In 440, the partner capital accounting system allocates earnings and taxable income/loss items to each partner. These are derived from the data in 430, combined with data on the ownership share of each partner at any point in time. From the data in 440, a capital account is generated for each partner in 450.

FIG. 4 shows the method of investing in further detail. Activities in FIG. 4 which have identical labeling to FIG. 2 are the same as in the prior discussion. In activity 199, the investment entity is structured as a pass-through entity. Activities 230A and 230B correspond to activity 230 in FIG. 2. In activity 230A, the investment manager would analyze and adjust the portfolio including review of the loss harvesting criterion, review of the balance between longs and shorts, and selection of positions for sale or cover. In activity 230B the amount of leverage would be reviewed and/or adjusted, always to be above 200%. Activity 260A is the same as activity 260 but is relabeled to show that the portfolio is either assembled in the first instance or reoptimized in later cycles. Activity 290A represents the implementation of decisions coming from 220, 230, and 280 for the harvesting of short term losses, which may arise either from the long positions or the short positions, according to the defined criteria, and the continued holding of positions having long term gains. Activities 300A and 300B correspond to activity 300 and show that distributions can be made either as cash or in-kind.

What is claimed is:

1. A tax efficient investment method comprising:
   a) organizing a pass-through entity into which a group of investors provide capital;
   b) running a computer program which projects expected future performance of financial instruments and displays results;
   c) purchasing for the pass-through entity, from the financial instruments evaluated by the computer program, a first group of instruments which is expected to perform better than a market consisting of the population of financial instruments of the type evaluated and selling short a second group of instruments which is expected to perform worse than said market;

d) funding the purchase of the first group of financial instruments with the proceeds from the short sales and with borrowings secured by the purchased financial instruments along with capital from the pass-through entity whereby the ratio of the sum of the absolute values of the first and second groups of instruments to the capital from the pass-through entity is at least 200 when expressed as a percent;

e) selling financial instruments from the first group or covering short positions from the second group to produce short term capital losses which exceed the sum of short term capital gains realized from the sale of financial instruments from the first group and covering of short positions from the second group; and f) making in-kind distributions of investments to investors withdrawing from the pass-through entity.

2. The method of claim 1, wherein the computer program is based on one or more criteria selected from the group consisting of chart analysis, Dow theory, discounted summation of projected dividend stream plus terminal value, insider trading patterns, momentum analysis, comparison to peers in earnings growth, comparison to peers in dividend growth, comparison to peers in price to earnings ratio, comparison to peers in price to book ratio, and comparison to peers in returns on investment.

3. The method of claim 2, wherein the investors include those who have or expect to have short term capital gains from other holdings external to any gains arising from practice of this invention.

4. The method of claim 3, wherein the investments chosen for distribution-in-kind to redeeming investors provide a tax-related advantage to the pass-through entity.

5. The method of claim 4, wherein the pass-through entity is a limited partnership or a limited liability corporation.

6. The method of claim 1, wherein a second computer program is used to determine when the pass-through entity is advantaged by in-kind distribution to redeeming investors.

* * * * *